(12) United States Patent
Müller et al.

(10) Patent No.: US 11,592,083 B2
(45) Date of Patent: Feb. 28, 2023

(54) CONFIGURATION OF GEARSHIFT VARIANTS

(71) Applicant: DEERE & COMPANY, Moline, IL (US)

(72) Inventors: David Müller, Mannheim (DE); Rainer Gugel, Mannheim (DE); Frank Buhrke, Mannheim (DE); Michael Schumann, Mannheim (DE)

(73) Assignee: DEERE & COMPANY, Moline, IL (US)

( * ) Notice: Subject to any disclaimer, the term of this patent is extended or adjusted under 35 U.S.C. 154(b) by 354 days.

(21) Appl. No.: 16/807,985

(22) Filed: Mar. 3, 2020

(65) Prior Publication Data

US 2020/0284340 A1   Sep. 10, 2020

(30) Foreign Application Priority Data

Mar. 6, 2019   (EP) .................................... 19161074
Mar. 6, 2019   (EP) .................................... 19161083
(Continued)

(51) Int. Cl.
*F16H 59/08*   (2006.01)
*F16H 3/093*   (2006.01)
(Continued)

(52) U.S. Cl.
CPC ............. *F16H 3/093* (2013.01); *F16H 59/08* (2013.01); *F16H 2003/0818* (2013.01);
(Continued)

(58) Field of Classification Search
CPC .. F16H 3/093; F16H 59/08; F16H 2003/0818; F16H 2003/0822;
(Continued)

(56) References Cited

U.S. PATENT DOCUMENTS 4,063,464 A   12/1977   Crabb
4,721,002 A   1/1988   Horii
(Continued)

FOREIGN PATENT DOCUMENTS

DE   2645907 A1   4/1978
DE   2847245 A1   5/1980
(Continued)

OTHER PUBLICATIONS

European Search Report issued in counterpart application No. 19161101.1 dated Sep. 13, 2019. (16 pages).
(Continued)

*Primary Examiner* — Justin Holmes (57)   ABSTRACT

A method is provided for configuring different numbers of gearshift variants in a stepped powershift transmission for an agricultural working machine. The method includes providing a transmission unit, a front-mounted range unit, a gear reduction unit, a rear-mounted range unit, a housing, a drive shaft, a lay shaft, an output shaft, and a hydraulic control arrangement. The same transmission unit is used for all the numbers of gearshift variants while an identical spatial orientation of the shafts is maintained for all the numbers of gearshift variants. The method further includes adapting exclusively the gearshift variants by varying the front-mounted range unit or the rear-mounted range unit.

2 Claims, 5 Drawing Sheets

(30) Foreign Application Priority Data

Mar. 6, 2019 (EP) .................................. 19161089
Mar. 6, 2019 (EP) .................................. 19161101

(51) Int. Cl.
*F16H 3/08* (2006.01)
*F16H 57/02* (2012.01)
*F16H 61/04* (2006.01)

(52) U.S. Cl.
CPC ............. *F16H 2003/0822* (2013.01); *F16H 2003/0933* (2013.01); *F16H 2057/02056* (2013.01); *F16H 2061/0481* (2013.01); *F16H 2200/0078* (2013.01); *F16H 2200/0082* (2013.01)

(58) Field of Classification Search
CPC ... F16H 2003/0933; F16H 2057/02056; F16H 2061/0481; F16H 2200/0078; F16H 2200/0082; F16H 57/033; F16H 2037/044; F16H 2057/0335; F16H 37/043; F16H 2037/045
See application file for complete search history.

(56) References Cited

U.S. PATENT DOCUMENTS

| | | |
|---|---|---|
| 4,777,837 A | 10/1988 | Lehle |
| 4,824,128 A | 4/1989 | Takagi et al. |
| 5,081,878 A | 1/1992 | Stasiuk |
| 5,269,732 A | 12/1993 | Weiss et al. |
| 5,613,401 A | 3/1997 | Maurizio |
| 6,138,528 A | 10/2000 | Fukumoto et al. |
| 9,856,973 B1 | 1/2018 | Owen et al. |
| 2007/0266812 A1 | 11/2007 | Asada |
| 2010/0200323 A1 | 8/2010 | Egawa et al. |
| 2012/0048043 A1 | 3/2012 | Vu |
| 2015/0112560 A1 | 4/2015 | Bremner |
| 2016/0327128 A1 | 11/2016 | Raisch et al. |
| 2018/0187760 A1 | 7/2018 | Pauli et al. |
| 2018/0372188 A1 | 12/2018 | Hana et al. |
| 2019/0063556 A1 | 2/2019 | Bulgrien |
| 2020/0047601 A1 | 2/2020 | Park et al. |

FOREIGN PATENT DOCUMENTS

| | | | |
|---|---|---|---|
| DE | 102010039349 A1 * | 2/2012 | ........... F16H 37/043 |
| DE | 102011081520 A1 | 3/2012 | |
| DE | 1020011080565 A1 | 2/2013 | |
| DE | 102013217187 A1 * | 3/2015 | ............. F16H 3/093 |
| DE | 102016208646 A1 | 11/2017 | |
| DE | 102017209602 A1 | 1/2018 | |
| DE | 102017212392 A1 | 1/2019 | |
| EP | 0745198 B1 | 8/1998 | |
| GB | 2033032 A | 5/1980 | |
| WO | WO-9936285 A2 * | 7/1999 | ........... F16H 37/042 |
| WO | 2013064371 A1 | 5/2013 | |

OTHER PUBLICATIONS

European Search Report issued in counterpart application No. 19161089.8 dated Sep. 13, 2019 (13 pages).
European Search Report issued in counterpart application No. 19161083.1 dated Sep. 13, 2019 (16 pages).
European Search Report issued in counterpart application No. 19161074.0 dated Sep. 13, 2019 (13 pages).
European Search Report issued in European Patent Application No. 19161074.0, dated Sep. 13, 2019, 27 pages.
European Search Report issued in European Patent Application No. 19161083.1, dated Sep. 13, 2019, 33 pages.
European Search Report issued in European Patent Application No. 19161089.8, dated Sep. 13, 2019, 26 pages.
European Search Report issued in European Patent Application No. 19161101.1, dated Sep. 13, 2019, 32 pages.

* cited by examiner

CONFIGURATION OF GEARSHIFT VARIANTS

RELATED APPLICATIONS

This application claims priority to European Patent Application Ser. No. 19161101.1, filed Mar. 6, 2019, European Patent Application Ser. No. 19161089.8, filed Mar. 6, 2019, European Patent Application Ser. No. 19161083.1, filed Mar. 6, 2019, and European Patent Application Ser. No. 19161074.0, filed Mar. 6, 2019, the disclosures of which are hereby incorporated by reference in their entirety.

FIELD OF THE DISCLOSURE

The present disclosure relates to a configuration of different numbers of gearshift variants in a stepped powershift transmission for an agricultural working machine.

BACKGROUND

A powershift transmission is a special form of a vehicle transmission in which the transmission ratio can be changed under load, that is to say during travel, without interrupting the torque. As a result, propulsion forces can be transmitted even during the shifting operation so that the vehicle can continue to accelerate even during the shifting operation. Therefore, no decreases in comfort occur during the shifting operation. In agricultural utility vehicles, particularly in tractors, powershift transmissions are mainly used because they permit faster work, in particular when working on hilly terrain and on changing types of soil, and help to save fuel. Some tractor transmissions can also be partially power shifted, which means that shifting without an interruption in the tractive force can only be performed between some of the gears, while other gears (for example, a group change) are associated with an interruption in the tractive force.

It is known to form these transmissions in conjunction with planetary transmissions and clutches in a modular system, so that by virtue of a corresponding design and arrangement of gearwheel pairs of the planetary transmission, the powershift transmission can be operated in various operating modes such as a through-connected drive mode, gear reduction mode and reverse mode. Therefore, on tractors powershift transmissions are used as a pre-step transmission which, depending on the design of a multi-step planetary set, can either be operated in the through-connected drive mode or reverse mode operating modes or in the through-connected drive mode or gear reduction mode operating modes.

These transmissions are characterized by the fact that in a first shift operation a clutch, which is connected to an input shaft, connects the input shaft to the output shaft so that the transmission can be operated in the through-connected drive mode, wherein the planetary gear mechanism turns freely. In a second shift operation, the clutch is released so that the planetary carrier is driven by the input shaft and the planetary set revolves around a first sun gear which is fixed in place by a brake through which the output shaft extends. The power output occurs via a second sun gear which is connected to the output shaft and is driven by the planetary set. Depending on the assignment of the planetary set and the design of the gear sets of planetary set and sun gears, the powershift transmission may be operated in gear reduction mode or in reverse mode.

Therefore, a two-step powershift transmission is made available which is, however, on the one hand, costly in terms of fabrication technology and, on the other hand, does not permit a further operating mode, for example, a crawling speed mode, in the specified arrangement.

EP 0 745 198 B1 describes a powershift transmission for mobile working machines and a method for controlling this powershift transmission. In this context, hydraulic motors are used which are connected to one another via a clutch. In a lower speed range, the hydraulic motors are connected together in a torque-adding fashion. One of the hydraulic motors is reconfigured by a further clutch so that the hydraulic motors can be operated in an adding fashion in an upper speed range rotational speed.

WO 2013/064371 A1 describes a powershift transmission with an output shaft and an output shaft which is arranged coaxially with respect thereto. The powershift transmission has a planetary gear set. The planetary gear set comprises a planet carrier which is connected to the input shaft. The first output shaft can be connected to the output-side sun of a multi-step planetary set by a shift element. The first output shaft can be connected directly to the input shaft by a second shift element. The input-side sun gear of the multi-step planetary set is connected in a rotationally fixed fashion to a housing part of the powershift transmission.

SUMMARY

In the present disclosure, a transmission unit may be provided which permits the widest possible use and, if appropriate, can also be used for different vehicle types. As result, effective production of the vehicles is to be ensured. In this context, the transmission unit is intended to be distinguished by compact dimensions and the simplest possible assembly. In addition, the transmission unit is to be distinguished by a reliable mode of operation and a service life which is as long as possible. Different transmission steps are to be easily integrated into the unit, wherein a simple change between forward travel and reverse travel is also to be made possible.

According to the disclosure, in each case the same transmission unit is used for different numbers of gearshift variants. The transmission unit is limited by a fixed housing which is identical for all transmission units and accordingly has the same spatial dimensions. Within this housing, the shafts are identical and are spatially oriented in completely the same way for all the gearshift variants. In this context, both the spatial orientation of the shafts with respect to one another and the shaft within the housing correspond completely for all the variants.

As a result, in the same layout different numbers of maximum gearshift variants can be implemented, that is to say, for example, 12-gear, 18-gear, 24-gear, or 32-gear variants. The transmission unit according to the disclosure is therefore configured with its dimensions with respect to the housing and the arrangement of the shafts within the housing in such a way that different maximum numbers of gear variants for different vehicle types can be configured in each case with the same transmission unit.

The housing and the shafts of the front-mounted range unit, the gear reduction unit and the rear-mounted range unit are permanently specified. Different numbers of gearshift variants can be implemented by adding and omitting gearwheel steps.

In one variant of the disclosure, the hydraulic actuation arrangement is also identical in all the variants. Therefore, a transmission unit is made available as a base module, in which the arrangement of the shafts, the housing and the entire hydraulic actuation are identical for all the variants.

Different numbers of gearshift variants can be implemented by the targeted addition and omission of gearwheel steps.

In conventional arrangements, the entire orientation of the shafts and the hydraulic actuation had to be adapted for each transmission. This can be very costly and entails high costs for the production of the transmission. In contrast, the transmission module according to the present disclosure is configured in such a way that in each case just one module can be used for different variants.

Therefore, a modular system is made available which permits cost-saving production. At the same time, a stable transmission unit is made available which is distinguished by compact dimensions and permits flexible use.

The transmission unit is suitable for configuring at least two different numbers of gear speed variants, that is to say, for example, 18 and 32. A plurality of numbers, that is to say, for example, 12, 18 and 32 or 12, 18, 24 and 32, of gear speed variants can also be configured.

In one embodiment of the disclosure, a solid shaft is used as the input shaft. A hollow shaft is therefore intentionally dispensed with as an input shaft.

In another embodiment of the disclosure, all the gear steps rotate in the same direction. This provides the possibility of an optimized toothing arrangement. Furthermore, no load changes are necessary during reversing. The fixed wheels on the input shaft or the freely moving wheels which are in engagement on the auxiliary shaft can be used, for example, to drive auxiliary drives. In other words, the wheels may be used, for example, for pumps, compressors or the water pump. This also permits an implementation for driving a pump arranged at a low position.

In one shifting scenario, just the range unit steps have to be adapted in order to convert a PST (powershift transmission) into a PPST (planetary powershift transmission). The high and low circuits and the gear steps remain otherwise the same.

The clutches of the powershift transmission can be seated on one or other of the shafts. The configuration according to the disclosure permits the re-use of gearwheels by virtue of a compact configuration. The reverse possibility can be integrated into high/low by means of a lay shaft. It is also considerable for a power reverser which is connected upstream to be integrated.

The transmission unit according to the disclosure can be embodied as a three-shaft arrangement or four-shaft arrangement. This concept permits a high degree of flexibility. The modular system can be used in various vehicles and can be adapted to the respective requirement.

In the three-shaft embodiment, the direct gear can be implanted by means of high, and with low by means of the lay shaft. It is also conceivable that in the three-shaft embodiment the direct gear is implemented in low, and the high gear by means of the lay shaft. This permits a high degree of flexibility and good interweaving.

The design according to the present disclosure functions for central and laterally offset main shafts. The method according to the disclosure for configuration with a single transmission unit permits different transmission types to be implemented in one structure. Different numbers of clutches and synchromeshes can be used for this. The synchromeshes can be shifted manually or in an automated fashion.

In a four-shaft embodiment, direct gears (input/output shaft) are also possible.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein.

Corresponding reference numerals are used to indicate corresponding parts throughout the several views.

DETAILED DESCRIPTION

The embodiments of the present disclosure described below are not intended to be exhaustive or to limit the disclosure to the precise forms disclosed in the following detailed description. Rather, the embodiments are chosen and described so that others skilled in the art may appreciate and understand the principles and practices of the present disclosure.

Figure 1:
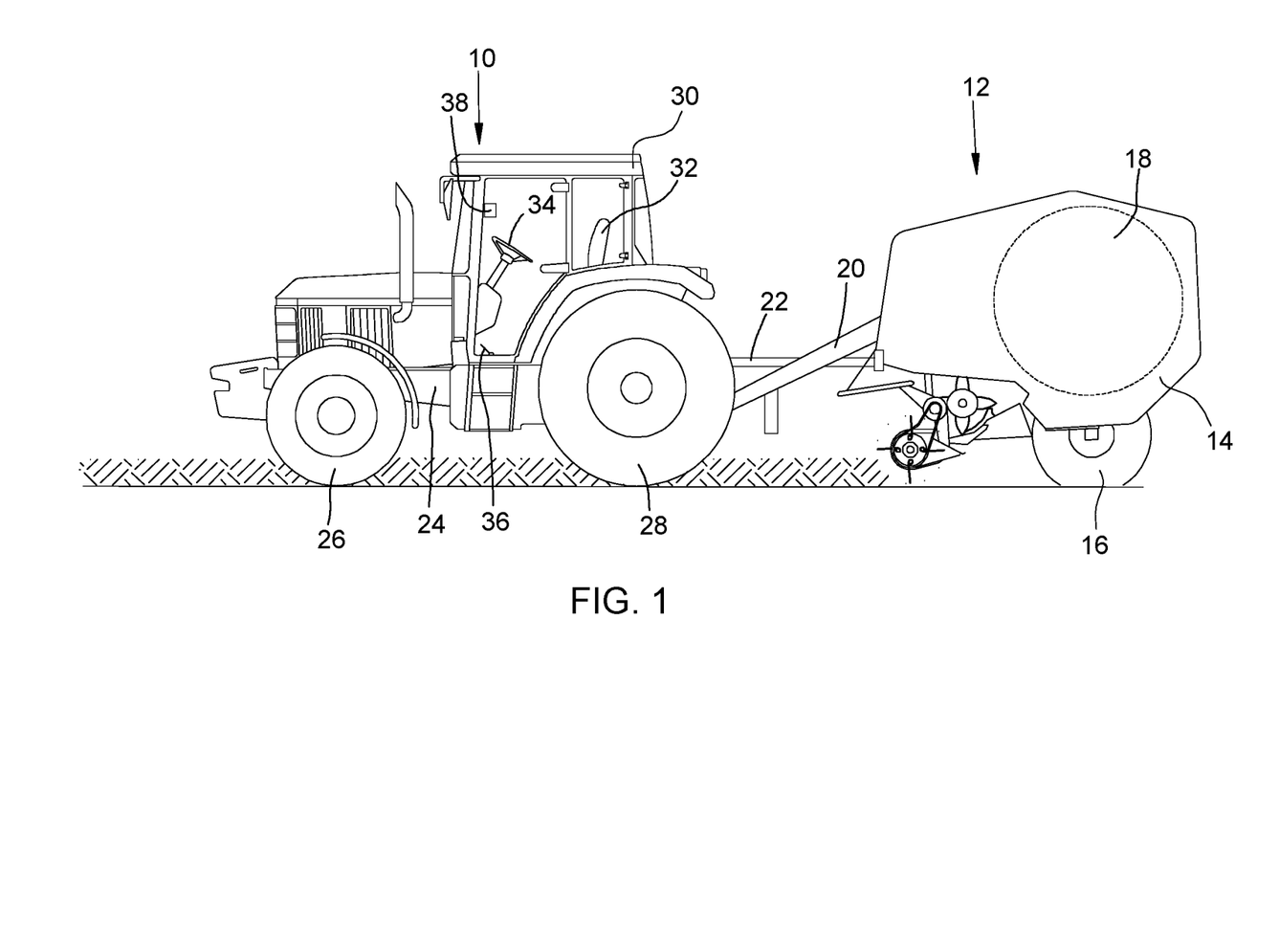
FIG. 1 shows a schematic illustration of an agricultural working machine.

In one embodiment shown in FIG. 1, an agricultural working machine is provided in the form of a tractor 10 and any desired implement 12 which is towed by the tractor and is embodied, for example, as a round bale press. The implement 12 comprises a chassis 14 which is supported on wheels 16 and has a bale-forming chamber 18. The implement 12 is towed by the tractor 10 by a drawbar 20. The driveable elements of the drawbar 20 are driven by the tractor 10 by a power take-off shaft 22.

The tractor 10 comprises a chassis 24 which is supported on front, steerable wheels 26 and driven wheels 28 at the rear. An operator workstation with a seat 32 is located in a cab 30. A steering wheel 34, an accelerator pedal 36 and an operator position 38 can be activated from the seat.

Figure 2:
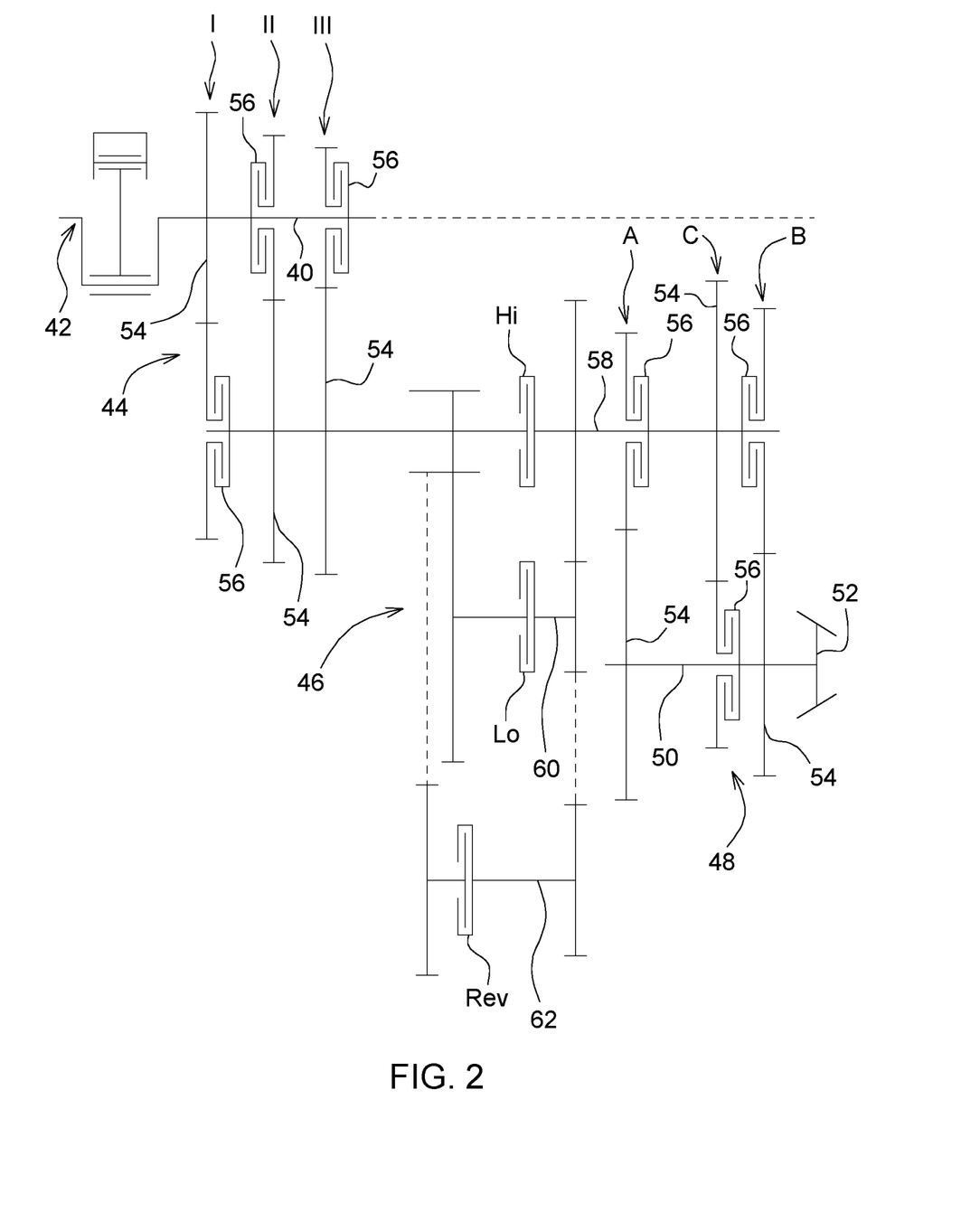
FIG. 2 shows a three-shaft variant of a powershift transmission with 18 gearshift variants.

FIG. 2 shows a schematic illustration of a powershift transmission. According to the illustration in FIG. 2, this is a three-shaft design of a powershift transmission with a total of 18 gearshift variants. The three-shaft variant according to FIG. 2 has an even number of tooth meshes. A drive or input shaft 40 is connected to a drive 42 which is embodied in the embodiment as an internal combustion engine. The powershift transmission according to FIG. 2 comprises a front-mounted range unit 44, a gear reduction unit 46 and a rear-mounted range unit 48. The torque is transmitted to a bevel gear 52 via an output shaft 50. The front-mounted range unit comprises, according to the embodiment in FIG. 2, a total of three gear steps I, II and III with three gearwheels 54 and three clutches 56.

A reverse step is integrated into the gear reduction unit. The rear mounted range unit 48 comprises a total of three range unit steps A, B and C with three gearwheels 54 and three clutches 56. Apart from the drive shaft 40 and the output shaft 50, the powershift transmission also comprises a lay shaft 58 positioned between the drive shaft 40 and the output shaft 50. Furthermore, the low shaft 60 and the reverse shaft 62 are also present in the powershift transmission.

The powershift transmission according to FIG. 2 is configured of 18 gearshift variants. The number of gearshift variants is obtained by multiplying the number of gear steps of the front-mounted range unit 44 by the shift steps of the gear reduction unit 46 times the number of range unit steps of the rear-mounted range unit 48. In the embodiment according to FIG. 2, this results in 3×2×3 and therefore a total of 18 gearshift variants.

Figure 3:
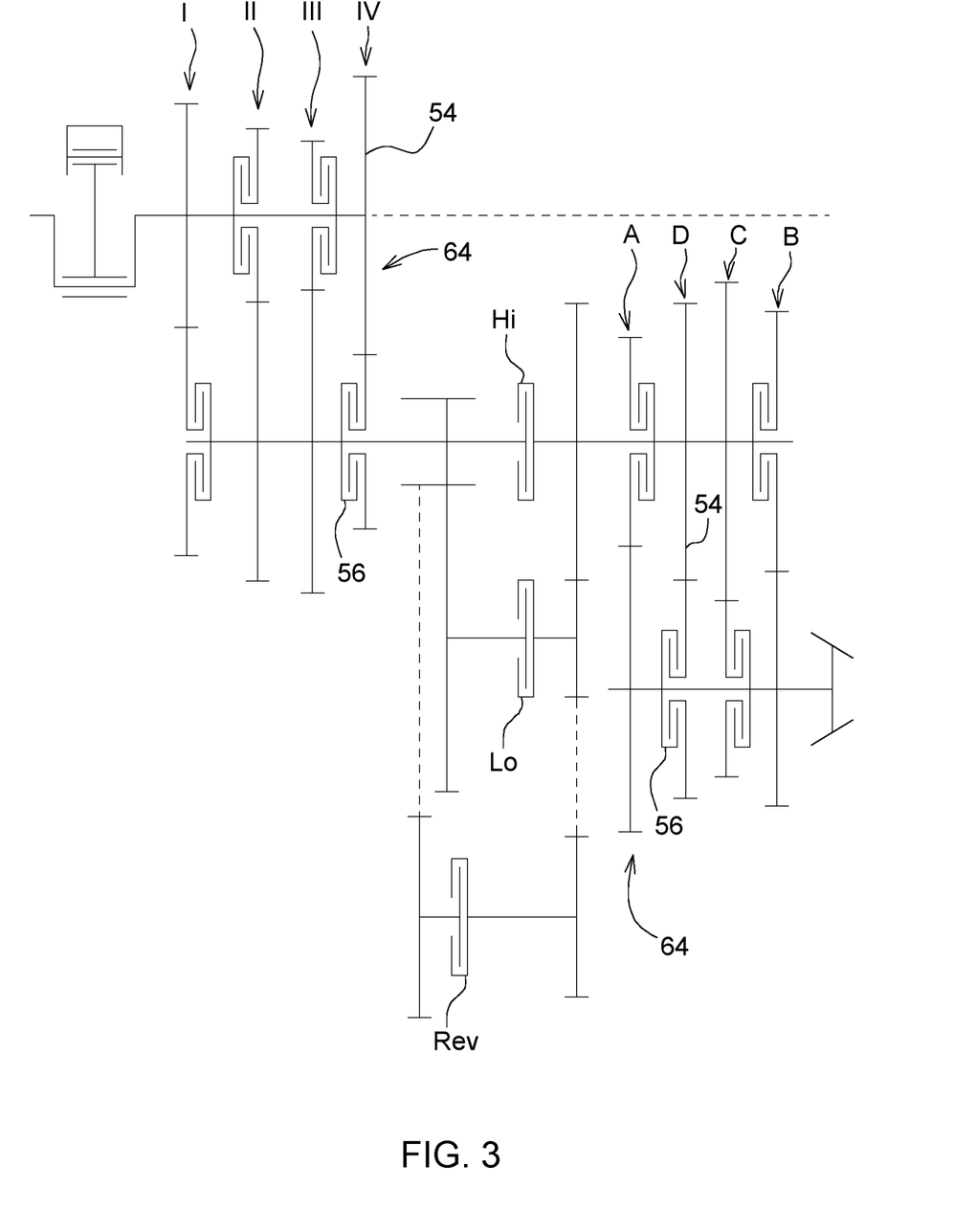
FIG. 3 shows a three-shaft variant of a powershift transmission with 32 gearshift variants.

According to the illustration in FIG. 3, a total of 32 gearshift variants are configured in the same transmission unit, which is permanently bounded by the identical housing as in FIG. 2 and has the same shaft arrangement as in FIG. 2. According to the disclosure, the dimensions in the transmission unit are selected such that a further gearwheel unit 64 can be added both in the front-mounted range unit 44 and in the rear-mounted range unit 48. Each additional gearwheel unit 64 comprises a gearwheel 54 and a clutch 56.

In the embodiment according to FIG. 3, the powershift transmission has a total of 32 gearshift variants. The total number of gearshift variants results from the number of gear steps of the front-mounted gear unit 44, which in the embodiment according to FIG. 3 comprises a total of four gear steps I, II, III and IV, wherein each gear step is equipped as a gearwheel step 64 with a gearwheel 54 and a clutch 56. The number of gear steps of the front-mounted range unit 44 is multiplied by the two gears of the gear reduction unit (high and low) and then also by the number of range unit steps. In the embodiment according to FIG. 3, these are four range unit steps A, B, C, D. This results in a total number of gearshift variants of 4×2×4, and therefore 32 gearshift variants.

Figure 4:
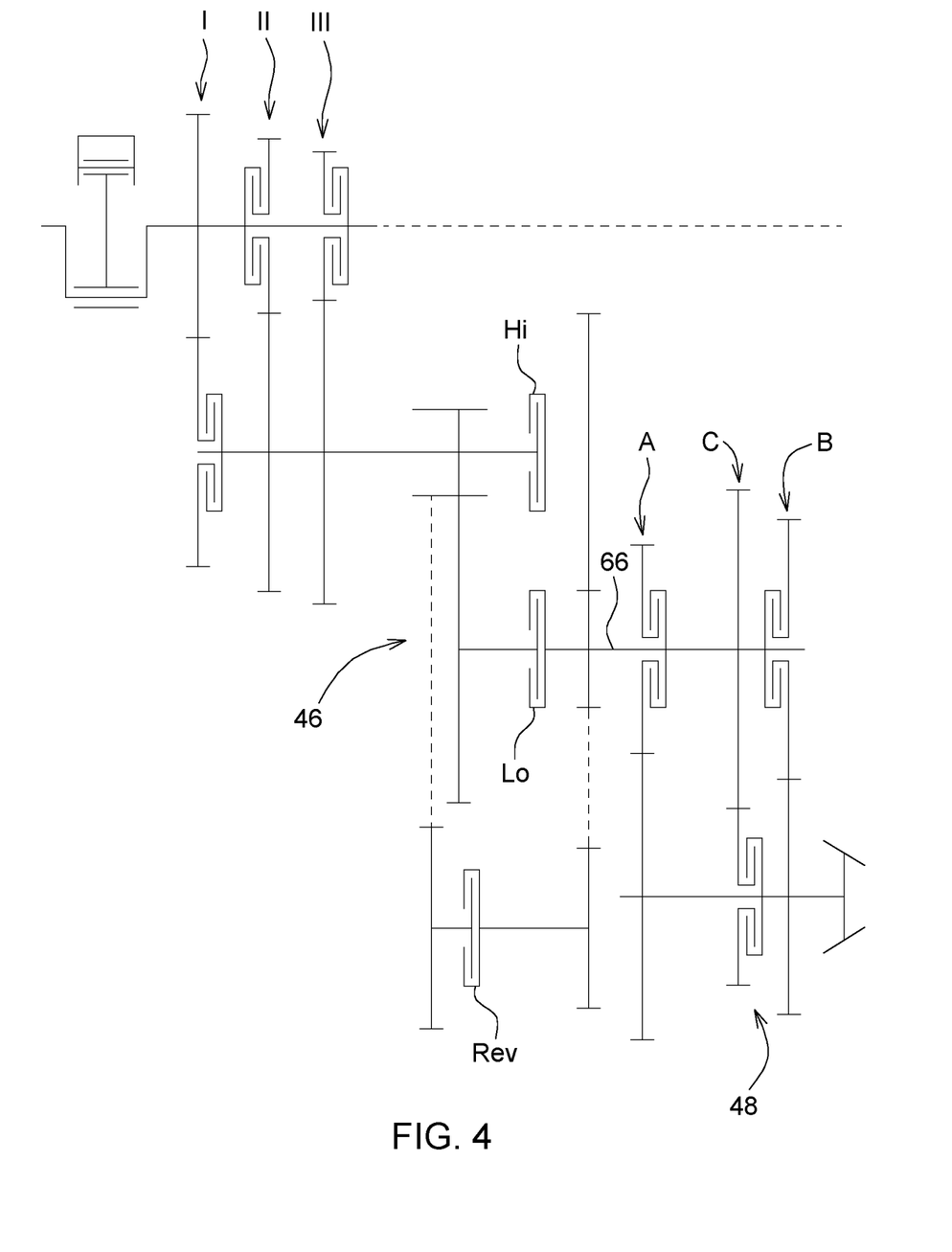
FIG. 4 shows a four-shaft variant of a powershift transmission with 18 maximum gearshift variants.
Figure 5:
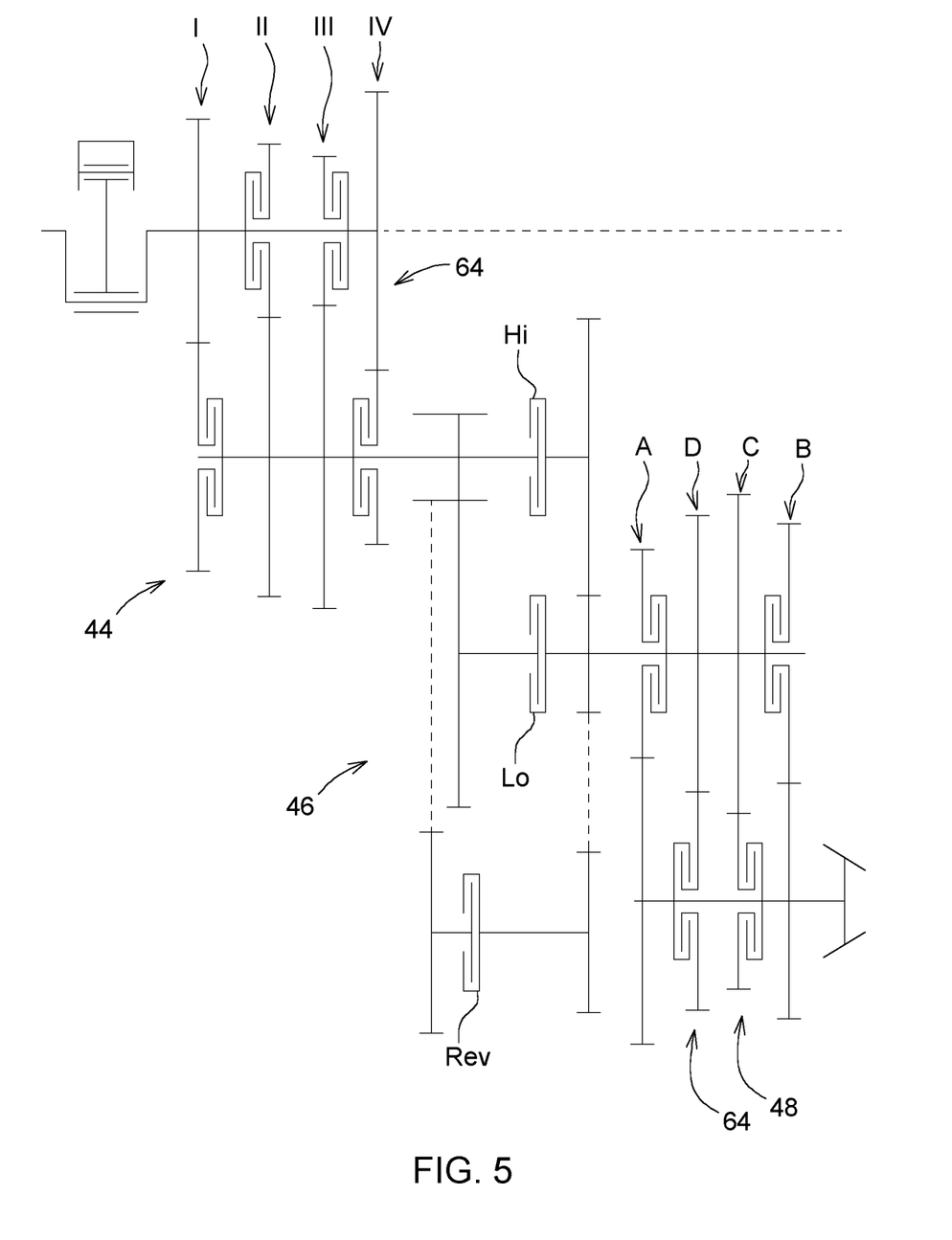
FIG. 5 shows a four-shaft variant of a powershift transmission with 32 gearshift variants.

FIGS. 4 and 5 each show four shaft embodiments. These are also sometimes referred to as two-shaft designs. In the embodiments illustrated in FIGS. 4 and 5, there is an uneven number of tooth meshes. In the variants according to FIGS. 4 and 5, an additional shaft 66 is present compared to the embodiments in FIGS. 2 and 3. The shaft 66 is part of the rear-mounted range unit 48. The low step of the gear reduction unit 46 is located on the shaft 66.

In the embodiment according to FIG. 4, the three gear steps of the front-mounted step 44, specifically I, II and II, which each comprise a gearwheel set 64 with a gearwheel 54 and a clutch 56, and the two shift steps of the gear reduction unit 46, the high and low step, and the three range unit steps of the rear-mounted range unit 48, specifically A, B and C, result in a total of 18 shift variants by multiplication: 3×2×3.

According to the disclosure, for the configuration according to FIG. 5, the same transmission unit is used as in FIG. 4, wherein all the shafts have the same spatial orientation in an identical fixed housing which surrounds the transmission unit. According to the disclosure, the dimensions of the transmission unit are selected such that a further gearwheel step 64 can be added both in the front-mounted range unit 44 and in the rear-mounted range unit 48. Therefore, with 4×2×4 this results in a total of 32 gearshift possibilities.

While embodiments incorporating the principles of the present disclosure have been disclosed hereinabove, the present disclosure is not limited to the disclosed embodiments. Instead, this application is intended to cover any variations, uses, or adaptations of the disclosure using its general principles. Further, this application is intended to cover such departures from the present disclosure as come within known or customary practice in the art to which this disclosure pertains and which fall within the limits of the appended claims.

The invention claimed is:

1. A method for configuring different numbers of gearshift variants in a transmission housing of a stepped powershift transmission for an agricultural working machine, comprising:

configuring a first gearshift variant having eighteen gear speed variants, the first gearshift variant including:
an input shaft connected to a drive;
an output shaft connected to a bevel gear;
a lay shaft positioned between the input shaft and the output shaft;
a low shaft;
a reverse shaft;
a front-mounted range unit connecting the input shaft to the lay shaft, the front-mounted range unit including a first plurality of gear steps having three gear steps with three gearwheels and three clutches;
a rear-mounted range unit connecting the lay shaft to the output shaft, the rear-mounted range unit including a first plurality of range unit steps having three range unit steps with three gearwheels and three clutches; and
a gear reduction unit positioned between the front-mounted range unit and the rear-mounted range unit, the gear reduction unit connecting the low shaft and the reverse shaft to the lay shaft, the gear reduction unit including a high gear step, a low gear step, a reverse gear step with a high clutch, a low clutch, and a reverse clutch;

configuring a second gearshift variant having thirty-two gear speed variants, the second gearshift variant including:
the input shaft connected to the drive;
the output shaft connected to the bevel gear;
the lay shaft positioned between the input shaft and the output shaft;
the low shaft;
the reverse shaft;
the front-mounted range unit connecting the input shaft to the lay shaft, the front-mounted range unit including a second plurality of gear steps having four gear steps with four gearwheels and four clutches;
the rear-mounted range unit connecting the lay shaft to the output shaft, the rear-mounted range unit including a second plurality of range unit steps having four range unit steps with four gearwheels and four clutches; and
the gear reduction unit positioned between the front-mounted range unit and the rear-mounted range unit, the gear reduction unit connecting the low shaft and the reverse shaft to the lay shaft, the gear reduction unit including the high gear step, the low gear step, the reverse gear step with the high clutch, the low clutch, and the reverse clutch;

configuring a third gearshift variant having eighteen gear speed variants, the third gearshift variant including:
the input shaft connected to the drive;
the output shaft connected to the bevel gear;
the lay shaft positioned between the input shaft and the output shaft;
an additional shaft, instead of the low shaft, positioned between the lay shaft and the output shaft;
the reverse shaft;
the front-mounted range unit connecting the input shaft to the lay shaft, the front-mounted range unit including the first plurality of gear steps having three gear steps with three gearwheels and three clutches;
the rear-mounted range unit connecting the lay shaft to the output shaft, the rear-mounted range unit including the first plurality of range unit steps having three range unit steps with three gearwheels and three clutches; and the gear reduction unit positioned between the front-mounted range unit and the rear-mounted range unit, the gear reduction unit connecting the additional shaft and the reverse shaft to the lay shaft, the gear reduction unit including the high gear step, the low gear step, the reverse gear step with the high clutch, the low clutch, and the reverse clutch;

configuring a fourth gearshift variant having thirty-two gear speed variants, the fourth gearshift variant including:
  the input shaft connected to the drive;
  the output shaft connected to the bevel gear;
  the lay shaft positioned between the input shaft and the output shaft;
  the additional shaft, instead of the low shaft, positioned between the lay shaft and the output shaft;
  the reverse shaft;
  the front-mounted range unit connecting the input shaft to the lay shaft, the front-mounted range unit including the second plurality of gear steps having four gear steps with four gearwheels and four clutches;
  the rear-mounted range unit connecting the lay shaft to the output shaft, the rear-mounted range unit including the second plurality of range unit steps having four range unit steps with four gearwheels and four clutches; and
  the gear reduction unit positioned between the front-mounted range unit and the rear-mounted range unit, the gear reduction unit connecting the additional shaft and the reverse shaft to the lay shaft, the gear reduction unit including the high gear step, the low gear step, the reverse gear step with the high clutch, the low clutch, and the reverse clutch;

arranging the shafts of the four gearshift variants in an identical spatial orientation within the same transmission housing forming a modular system;

configuring the four gearshift variants by exclusively varying the front-mounted range unit and rear-mounted range unit; and using the same hydraulic control arrangement for all four gearshift variants.

2. A transmission housing of a stepped powershift transmission for an agricultural working machine, comprising:
  a first gearshift variant having eighteen gear speed variants, the first gearshift variant including:
    an input shaft connected to a drive;
    an output shaft connected to a bevel gear;
    a lay shaft positioned between the input shaft and the output shaft;
    a low shaft;
    a reverse shaft;
    a front-mounted range unit connecting the input shaft to the lay shaft, the front-mounted range unit including a first plurality of gear steps having three gear steps with three gearwheels and three clutches;
    a rear-mounted range unit connecting the lay shaft to the output shaft, the rear-mounted range unit including a first plurality of range unit steps having three range unit steps with three gearwheels and three clutches; and
    a gear reduction unit positioned between the front-mounted range unit and the rear-mounted range unit, the gear reduction unit connecting the low shaft and the reverse shaft to the lay shaft, the gear reduction unit including a high gear step, a low gear step, a reverse gear step with a high clutch, a low clutch, and a reverse clutch;
  a second gearshift variant having thirty-two gear speed variants, the second gearshift variant including:
    the input shaft connected to the drive;
    the output shaft connected to the bevel gear;
    the lay shaft positioned between the input shaft and the output shaft;
    the low shaft;
    the reverse shaft;
    the front-mounted range unit connecting the input shaft to the lay shaft, the front-mounted range unit including a second plurality of gear steps having four gear steps with four gearwheels and four clutches;
    the rear-mounted range unit connecting the lay shaft to the output shaft, the rear-mounted range unit including a second plurality of range unit steps having four range unit steps with four gearwheels and four clutches; and
    the gear reduction unit positioned between the front-mounted range unit and the rear-mounted range unit, the gear reduction unit connecting the low shaft and the reverse shaft to the lay shaft, the gear reduction unit including the high gear step, the low gear step, the reverse gear step with the high clutch, the low clutch, and the reverse clutch;
  a third gearshift variant having eighteen gear speed variants, the third gearshift variant including:
    the input shaft connected to the drive;
    the output shaft connected to the bevel gear;
    the lay shaft positioned between the input shaft and the output shaft;
    an additional shaft, instead of the low shaft, positioned between the lay shaft and the output shaft;
    the reverse shaft;
    the front-mounted range unit connecting the input shaft to the lay shaft, the front-mounted range unit including the first plurality of gear steps having three gear steps with three gearwheels and three clutches;
    the rear-mounted range unit connecting the lay shaft to the output shaft, the rear-mounted range unit including the first plurality of range unit steps having three range unit steps with three gearwheels and three clutches; and
    the gear reduction unit positioned between the front-mounted range unit and the rear-mounted range unit, the gear reduction unit connecting the additional shaft and the reverse shaft to the lay shaft, the gear reduction unit including the high gear step, the low gear step, the reverse gear step with the high clutch, the low clutch, and the reverse clutch;
  a fourth gearshift variant having thirty-two gear speed variants, the fourth gearshift variant including:
    the input shaft connected to the drive;
    the output shaft connected to the bevel gear;
    the lay shaft positioned between the input shaft and the output shaft;
    the additional shaft, instead of the low shaft, positioned between the lay shaft and the output shaft;
    the reverse shaft;
    the front-mounted range unit connecting the input shaft to the lay shaft, the front-mounted range unit including the second plurality of gear steps having four gear steps with four gearwheels and four clutches;
    the rear-mounted range unit connecting the lay shaft to the output shaft, the rear-mounted range unit including the second plurality of range unit steps having four range unit steps with four gearwheels and four clutches; and the gear reduction unit positioned between the front-mounted range unit and the rear-mounted range unit, the gear reduction unit connecting the additional shaft and the reverse shaft to the lay shaft, the gear reduction unit including the high gear step, the low gear step, the reverse gear step with the high clutch, the low clutch, and the reverse clutch;

wherein the shafts of the four gearshift variants are arranged in an identical spatial orientation within the same transmission housing forming a modular system;

wherein the four gearshift variants are configured by exclusively varying the front-mounted range unit and rear-mounted range unit; and wherein the same hydraulic control arrangement is used for all four gearshift variants.

* * * * *